United States Patent
Gilbert et al.

(10) Patent No.: US 6,907,702 B2
(45) Date of Patent: Jun. 21, 2005

(54) STAGGERED LOOK SHAKE SIDING

(75) Inventors: Thomas Charles Gilbert, Clarklake, MI (US); Kenneth David Bosler, Holland, PA (US); Steven Craig Booz, Devon, PA (US)

(73) Assignee: Certainteed Corporation, Valley Forge, PA (US)

( * ) Notice: Subject to any disclaimer, the term of this patent is extended or adjusted under 35 U.S.C. 154(b) by 0 days.

(21) Appl. No.: 10/802,070

(22) Filed: Mar. 15, 2004

(65) Prior Publication Data

US 2004/0172910 A1 Sep. 9, 2004

Related U.S. Application Data

(60) Division of application No. 09/735,681, filed on Dec. 13, 2000, now Pat. No. 6,737,008, which is a continuation-in-part of application No. 09/190,038, filed on Nov. 12, 1998, now Pat. No. 6,319,456.

(51) Int. Cl.[7] .................................................. E04D 1/12

(52) U.S. Cl. .............................. 52/555; 52/554; 52/560; 52/535; 52/313; 52/314; D25/139; 428/151

(58) Field of Search ........................ 52/555, 554, 311.1, 52/313, 560, 314, 535; D25/139, 149; 428/151, 152, 156, 141

(56) References Cited

U.S. PATENT DOCUMENTS

| | | | |
|---|---|---|---|
| 3,577,484 A | 5/1971 | Jacobson | |
| 3,635,614 A | 1/1972 | Long et al. | |
| 3,837,517 A | 9/1974 | Held, Jr. | |
| 4,015,391 A | 4/1977 | Epstein et al. | |
| 4,015,392 A | * 4/1977 | Eaton | 52/533 |
| 4,128,369 A | 12/1978 | Kemerer et al. | |
| 4,290,248 A | 9/1981 | Kemerer et al. | |
| 4,366,197 A | * 12/1982 | Hanlon et al. | 428/43 |
| 4,468,909 A | 9/1984 | Eaton | |
| 4,649,008 A | 3/1987 | Johnstone et al. | |
| 4,680,911 A | 7/1987 | Davis et al. | |
| 5,076,037 A | 12/1991 | Crick et al. | |
| 5,167,781 A | 12/1992 | Kemerer et al. | |
| 5,224,318 A | 7/1993 | Kemerer | |
| 5,244,618 A | 9/1993 | Kemerer et al. | |
| 5,249,402 A | 10/1993 | Crick et al. | |
| 5,314,325 A | 5/1994 | Bosler | |
| 5,330,341 A | 7/1994 | Kemerer et al. | |
| 5,347,784 A | 9/1994 | Crick et al. | |
| 5,363,623 A | 11/1994 | King | |
| 5,444,099 A | 8/1995 | Abe et al. | |
| 5,458,477 A | 10/1995 | Kemerer et al. | |
| 5,505,599 A | 4/1996 | Kemerer et al. | |
| 5,505,612 A | 4/1996 | Mero et al. | |
| 5,575,127 A | 11/1996 | O'Neal | |
| 5,597,185 A | 1/1997 | Bray et al. | |
| 5,635,125 A | 6/1997 | Ternes et al. | |
| 5,651,227 A | 7/1997 | Anderson | |

(Continued)

OTHER PUBLICATIONS

Hand–Split Shake brochure, Nailite International, Miami, Florida (Date unknown).

Perfection–Plus Cedar brochure, Nailite International, Miami, Florida (Date unknown).

*Primary Examiner*—Naoko Slack
*Assistant Examiner*—Jennifer I. Thissell
(74) *Attorney, Agent, or Firm*—Duane Morris LLP

(57) ABSTRACT

Siding panels and intermediate articles of their manufacture are provided. The siding panels include a central portion including an aesthetic pattern and a pair of lateral edge portions which are molded while the polymeric material is still hot or molten. One exemplary aesthetic pattern provided is a cedar shake siding pattern. Adjacent cedar shake shingle impressions have substantially the same lengths, but a plurality of bottom edges of the individual shingle impressions are beveled to give the appearance of shingles having different lengths.

15 Claims, 7 Drawing Sheets

U.S. PATENT DOCUMENTS

| | | |
|---|---|---|
| 5,700,495 A | 12/1997 | Kemerer et al. |
| 5,729,946 A | 3/1998 | Beck |
| 5,857,303 A | 1/1999 | Beck et al. |
| 5,878,542 A | 3/1999 | Cornelius |
| 5,881,501 A | 3/1999 | Guffey et al. |
| 5,927,044 A | 7/1999 | Lamb et al. |
| D414,568 S | 9/1999 | Hedges et al. |
| 6,276,107 B1 | 8/2001 | Waggoner et al. |
| 6,319,456 B1 | 11/2001 | Gilbert et al. |
| 6,635,218 B2 * | 10/2003 | King .......................... 264/536 |

* cited by examiner

STAGGERED LOOK SHAKE SIDING

CROSS-REFERENCE TO RELATED APPLICATIONS

This application is a divisional application of U.S. patent application Ser. No. 09/735,681 filed Dec. 13, 2000, now U.S. Pat. No. 6,737,008, which is a continuation in part of U.S. patent application Ser. No. 09/190,038 filed Nov. 12, 1998 now U.S. Pat. No. 6,319,456, entitled "Apparatus and Method for Continuous Vacuum Forming Shaped Polymeric Articles," the entirety of which are hereby incorporated by reference herein.

FIELD OF THE INVENTION

This invention relates to the continuous manufacture of shaped articles, such as siding panels having the appearance of real wood, such as cedar shake.

BACKGROUND OF THE INVENTION

Continuous and semi-continuous processes for creating patterns on extruded plastic sheets have been used in the building components industry for a number of years. Some prior systems have disclosed rigid linked patterns for forming shaped impressions in an extruded sheet material. Unfortunately, such rigid shaped patterns tend to form unsightly horizontal seams in the material. Other systems have used pattern forms on rotating cylindrical drums. Although these processes are continuous, and do not produce horizontal seams, they often require expensive additional equipment and instrumentation to align the arcuate surface of the pattern with the relatively flat surface of the product, and to avoid, or correct, unwanted bowing of the product.

Because of the limitations on prior continuous processes, some manufacturers have opted for injection or blow molding such products one at a time. While this technique can provide the desired detail in texture and surface finish, it is limited to product sizes of about 4–5 feet in length and provide product thicknesses which are practically limited to greater than about 0.080 inches. This is generally because of the difficulty associated with flowing hot viscous polymer through thin cross-sectional profiles in steel molds. Additionally, because of the known size limitations, the randomness of individual features on the surface of a molded product is limited. This is because only a relatively small number of pattern elements, such as shingles, can be molded into the relatively small surface area. When several of these products are aligned side by side on a wall of a building, for example, it is sometimes obvious to see the pattern repeated over and over again.

One solution to these problems is disclosed in Bosler, U.S. Pat. No. 5,314,325 dated May 24, 1994. Bosler's invention provides a continuous vacuum forming process which uses a resilient mold belt for providing semi-continuous production of almost unlimited lengths of shaped polymeric articles. He further teaches a single cooling step whereby the entire width of the product is brought below the heat deflection temperature of the polymeric material.

It has now been determined, however, that a single cooling step reduces the temperature of the edge portions below a comfortable range for subsequent sizing and forming. Accordingly, there remains a need for providing for the separate formation of edge portions, such as butt-edges and nail edges customarily used in the fabrication of siding panels.

SUMMARY OF THE INVENTION

The present invention provides an extruded siding panel, and method of making the same, comprising a sheet of polymeric material. The sheet includes a molded central portion comprising a plurality of adjacent shingle impressions of substantially the same length. Each of the shingle impressions includes a bottom edge. At least one of the bottom edges of the shingle impressions is beveled to give the appearance of shingle impressions having different lengths.

The siding panel embodiments, described herein, provide the appearance of shingles having different lengths without the need to form shingle impressions having different lengths. This feature promotes the appearance of a miscellaneous selection of individual shingles on any wall covered with the siding pattern. The formation of the beveled edges is also easily incorporated into a continuous extrusion process and in a pattern that provides the aforementioned appearance of miscellaneous shingle selection. The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention as well as other information pertinent to the disclosure, in which.

DETAILED DESCRIPTION OF THE INVENTION

This invention provides improved methods and apparatus for forming the edge portions of vacuum formed continuous polymeric articles. As used herein, the terms "heat deflection temperature" is the temperature at which a polymeric material deflects 0.010 in. under a load of 66 or 164 psi, as defined in ASTM test D 648. Also as used herein, the term "polymeric material" shall mean polymeric compositions which may include additives, such as ultra-violet light stabilizers, fillers, plasticizers, tints, and other additives, such as glass or wood fiber, etc. The term "molded" means any number of processes, or combinations thereof, for forming an impression in a polymeric material, including compression molding, transfer molding, injection molding, blow molding, autoclave molding, contact molding, pressure bag molding, vacuum bag molding, deep draw molding, lay-up molding and spray molding, etc.

Figure 1A:
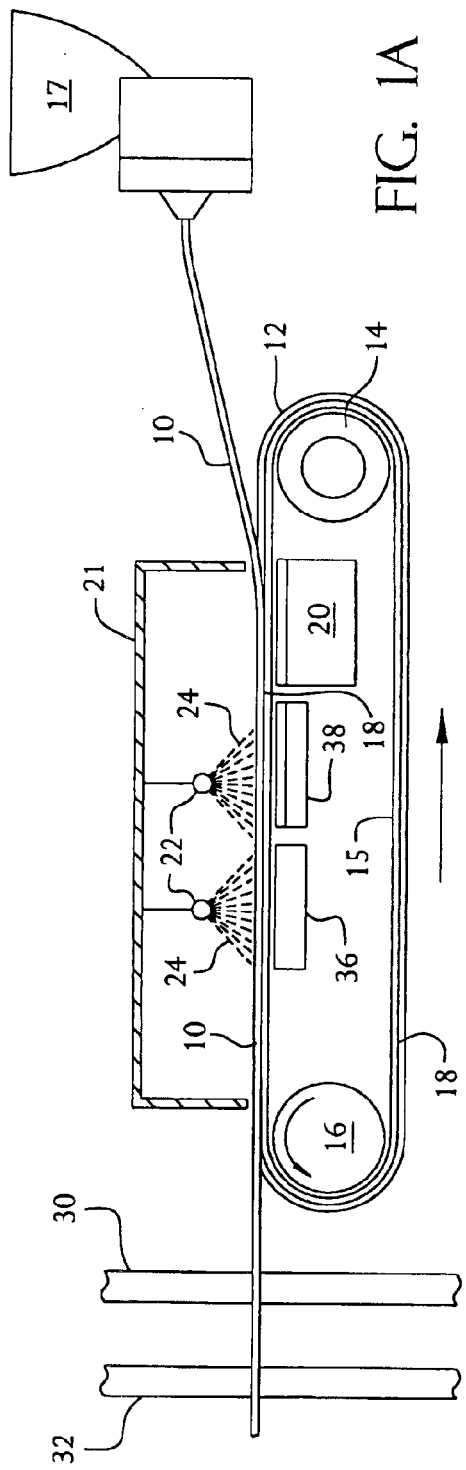
FIG. 1(a) is a partial diagrammatic side plan view of a preferred apparatus for the continuous vacuum forming of polymeric material of this invention.
Figure 2:
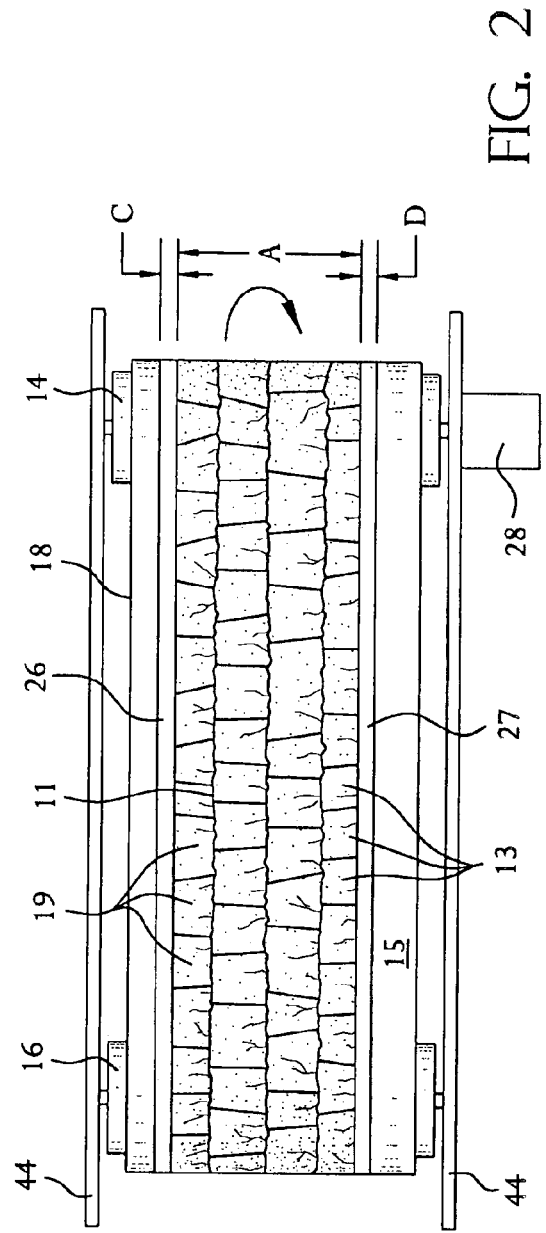
FIG. 2: is a top plan view of the mold belt portion of the apparatus of FIG. 1(a)

The preferred method of this invention is best understood by reference to the FIGS. 1(a)–6, which will now be explained. This method provides an apparatus for continuous vacuum forming of a hot plasticized material, including thermoplastic and thermosetting compositions, such as polyvinyl chloride ("PVC"), polyethylene, polypropylene, polyurethane, epoxy, polyester, etc., or other similar materials. As shown in FIG 1a, the hot plasticized material is first extruded from an extruder 17 and is then disposed upon a flexible rotating belt means 18 disposed within housing 44. The rotating belt means 18 is suspended between a first drive roller 14 and a second idle roller 16 in a substantially horizontal direction. The rotating belt means 18, shown in planar view in FIG. 2, preferably contains a porous drive belt 15 to facilitate flexing thereof and passing of air or vacuum pressure. It is most preferably made from stainless steel mesh or other open forms, such as interlocking metal or polymer sections, chain link, screen or hinged segments of corrosion resistant material. The rotating belt means 18 also preferably includes a softer, resilient mold belt 12 containing a mold impression 11, such as a series of cedar shake shingle impressions 19. This process can provide great detail in texture and shape, formerly associated with injection or blow molding operations. The resilient mold belt 12 also includes a plurality of apertures 13, therethrough for passing air, such as an applied vacuum pressure.

The first and second rollers 14 and 16 are spaced apart from one another in a generally horizontal direction such that the rotating belt means 18 extends between them, and forms a substantially flat forming surface. The mold belt 12 is preferably made of a resilient flexible material such as rubber, or rubber-like material, such as silicone or synthetic rubber.

The mold belt 12 and drive belt 15 can be frictionally engaged so that, by driving the drive belt 15 with drive axle 28 and drive roller 14, the mold belt 12 moves as well. The mold impression 11 of mold belt 12 substantially retains its shape as it spins, or stretches slightly, so there is no need for multiple sections and seams. The mold impression 11 preferably is one continuous longitudinally extending pattern as shown best in FIG. 2.

A vacuum box 20, or boxes, cooperates with a plurality of apertures 13 in the mold belt 12 and the open spaces in the drive belt 15 to draw a vacuum against the bottom surface of the extruded sheet 10. The drive belt 15 can optionally include longitudinal and lateral sections impregnated with polymeric or resilient rubberlike material which is relatively impervious to air flow. Such sections provide a plurality of vacuum openings, such as circles, or rectangles, etc., through which air can pass through the open weave metallic material of the preferred drive belt 15. Preferably the plurality of apertures 13 defined in the mold belt 12 are in open communication with respect to the vacuum sections of the drive belt portion 15. This facilitates drawing down of the hot extruded sheet 10 onto the mold impression 11 when vacuum box 20 is engaged. As the hot plastic is drawn onto the mold impression 11, fine detail is pressed into a central region defined by "A". Preferably the lateral edge portions 26 and 27 are not vacuum formed. Lateral edge portion 26 defined by dimension "C" and lateral edge portion 27, defined by dimension "D", can then be made into a nail edge or butt edge, by mechanical deformation, when the plastic is still hot. Alternatively, when thermosetting compositions are used, the material to be formed would be less than fully set, and would not be hot.

The described apparatus is ideally suited for PVC siding formulations. A good representative formulation is shown in Table 1 below:

| COMPONENT | AMOUNT BASED ON 100 PARTS PVC BY WEIGHT |
|---|---|
| PVC Resin (K-67, i.v. = 0.92) | 100.0 |
| Organotin Stabilizer | 1.0 |
| Acrylic Process Aid | 1.0 |
| Impact Modifier | 5.0 |
| Titanium Dioxide | 10.0 |
| Calcium Carbonate | 0–5.0 |
| Calcium Stearate | 1.0–1.5 |
| Paraffin Wax | 1.0–1.5 |
| Oxidized Polyethylene | 0–0.5 |

To facilitate formation of the final shaped product 30 exiting the apparatus of this embodiment, a cooling station may be included, such as one that includes water spray nozzles 22, a water spray 24, and water collectors 36 and 38. With preferred vinyl compositions the hot extruded sheet 10 is about 290–325° F. as it approaches the rotating belt 18. This is almost twice the heat deflection temperature of 160–170° F. typical for such compositions.

The extruded sheet 10, made from the preferred PVC composition, preferably remains above its heat deflection temperature while it is being plastically deformed during vacuum forming in the preferred mold impression 11. If the temperature of the polymer drops much below the heat deflection temperature for thermoplastic compositions, vacuum forming becomes impracticable. This is not a concern with compression or transfer molding. In the fabrication of vinyl siding products, using vacuum forming, it is preferred that the central patterned sheet portion represented by dimension "A" be cooled by water cooling in the cooling station. Waste water is then suctioned from the top surface of the product through separate vacuum devices or apertures 13 and is collected in water collectors 36 and 38. Alternatively, air or another gaseous medium can be used to selectively cool the extruded sheet.

In the preferred embodiment of this method, a pair of lateral edge portions 26 and 27, "C" and "D", are not cooled, but remain at a temperature of about 250° F. while the central patterned sheet portion "A" is cooled to about 140°–150° F. This enables the lateral edge portions 26 and 27 to be plastically deformed by mechanical means while still hot. When fabricating siding panels, one edge portion, for example, dimension "C", should be at least about 0.75–1.5 inches for producing a butt edge and a second portion, for example, dimension "D", should be at least about 2.0–4.0 inches for the hanger edge. Preferred shapes for such edges are described by butt edges 103 and 105 and nail edges 104 and 106 shown in FIGS. 4 and 5.

Alternatively, the pair of lateral edge portions 26 and 27 can be formed at least partially simultaneously with the vacuum formation of the central patterned sheet portion "A". As such, the butt and hanger edges can be formed during, immediately before, or immediately after vacuum forming the central patterned portion, so that the entire sheet is above the heat deflection temperature for at least a portion of the time the surfaces are being formed together. Then the entire extruded sheet can be cooled substantially simultaneously. This would save on further down stream operations and shorten the length of the processing apparatus.

The vacuum box 20 as shown in FIG. 1a may, alternatively, take the form of a plurality of individual vacuum devices for forming the hot plasticized material in multiple step operations as desired. The vacuum box 20 may also include individual vacuum chambers to form the hot plasticized material against the mold belt 12 in successive or separate steps within the same processing apparatus. Communication of vacuum pressure from the vacuum box 20 to the apertures 13 in the mold impression 11 is significantly enhanced by the vacuum sections formed in the drive belt portion 15, as shown in Bosler, U.S. Pat. No. 5,314,325, which is hereby incorporated by reference.

Figure 6:
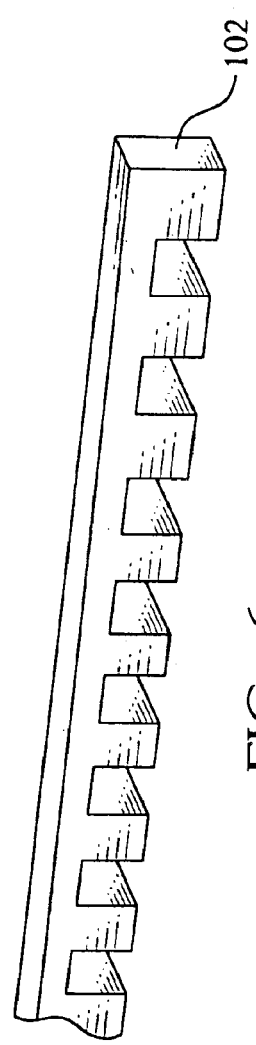
FIG. 6: is a partial front perspective view of a preferred dentil molding of this invention.
Figures 4, 5:
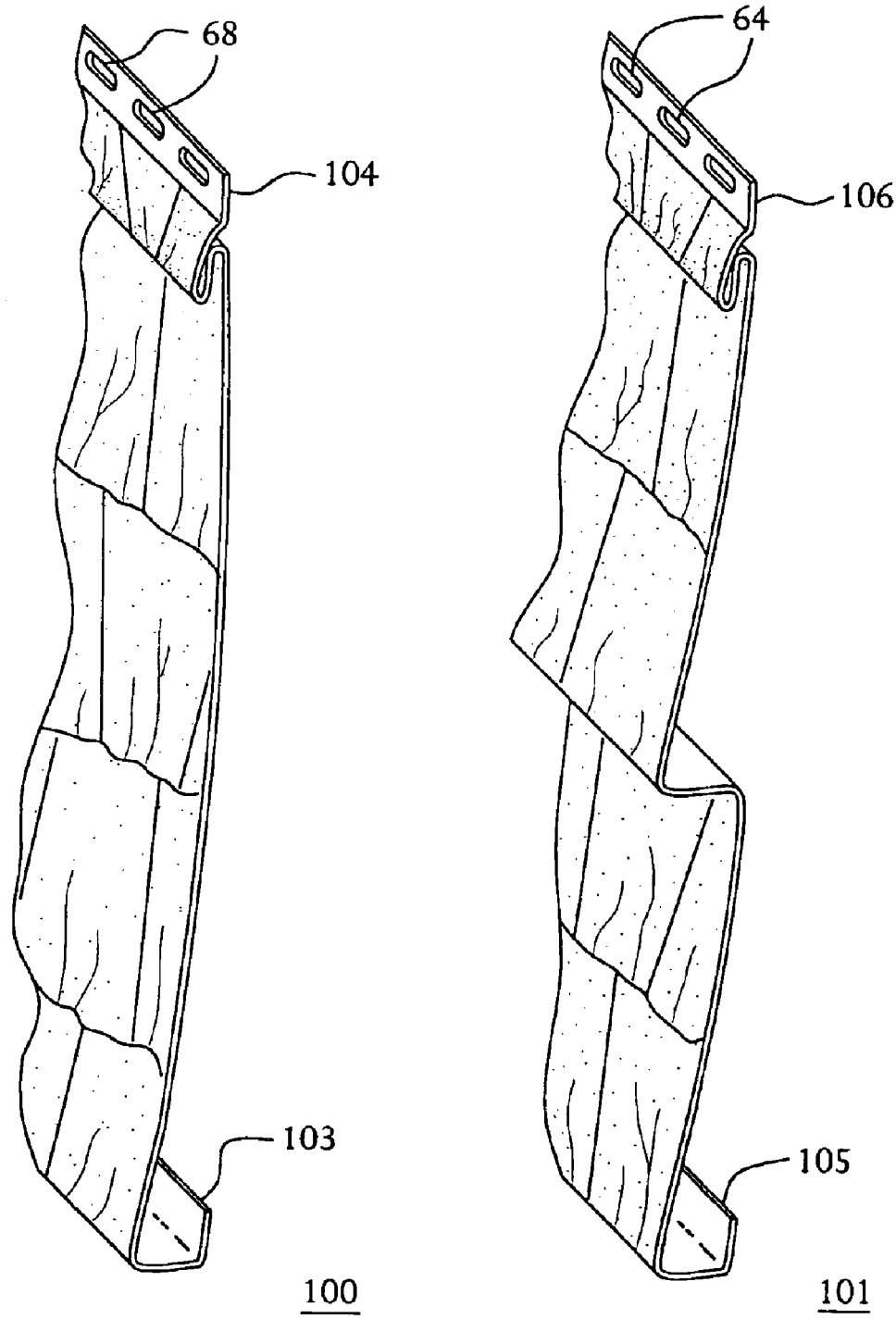
FIG. 4: is a partial front perspective view of a siding panel produced by this invention.
FIG. 5: is a partial front perspective view of an additional siding panel of this invention.

As shown in FIG. 4–6 the vacuum forming apparatus is preferably utilized for forming longer extending individual products such as siding panels 100 and 101 or dentil moldings 102. Alternatively, if a single pattern is used continuously around the outside of the mold belt 12, extremely long final products can be formed, such as 10–50 ft. in length, which is much longer than the distance between the idle roller 16 and drive roller 14, and much larger than presently known injection molded products, which have significant length limitations, due to the resistance of hot polymer flow in thin mold sections and mold and labor costs.

The vacuum forming apparatus is capable of such improved operation in view of the flexible resilience of the rotating belt 18 as well as the horizontally extending profile of the mold impression 11 during draw down of the hot plasticized material by vacuum box 26.

Most prior art devices utilize cylindrical molds against which the hot plasticized material is drawn. The cylindrical aspect of such forms provide significant difficulty in the removal of the final product. For example, it has been found that the arcuate configuration of drum-like molds renders the pattern less than desirable for siding applications, due to distortion and registration problems. Additionally, the final product must be removed from the cylindrical mold prior to cooling thereof, or it will result in unwanted curvature. Additional steps are generally required, which adds machinery and labor costs, resulting in a product which can be excessively expensive. The present method provides a means for eliminating these additional steps by allowing cooling of the product when in contact with the final mold in a substantially horizontal plane.

The present method is particularly useful for forming vinyl siding or other long continuous products and it is also specifically useful for embossing the surface thereof as desired for simulating texture, for example. The rubberized surface of the mold belt 12 means is particularly useful for facilitating removal of cooled product from the mold and also for maintaining vacuum sealed contact between the vacuum box 26 and the mold belt 12 during processing.

The apertures 13 defined within the mold belt 12 preferably have small holes of approximately 0.030–040 in. Such holes are desirably located in a pattern somewhat close to one another to facilitate drawing of the preferred hot plasticized vinyl composition downwardly in firm securement with respect to the mold impression 11. The mold impression 11 has been found to be useful for forming texture, protrusions or depressions as desired in the final product.

Additional processing stations can be included after initial formation of the product which can include foam lining along the top surface of the extruded sheet 10, such as by spraying a foamed polyurethane emulsion onto the back of a PVC cedar shake siding panel, for example. Subsequent vacuum and mechanical forming operations can also be accomplished for fabricating the final edges of the product, or to add texture or additional features. It is preferred that such steps are taken while the polymer section to be formed is still hot, and more preferably, when it is above its heat deflection temperature.

Figure 1B:
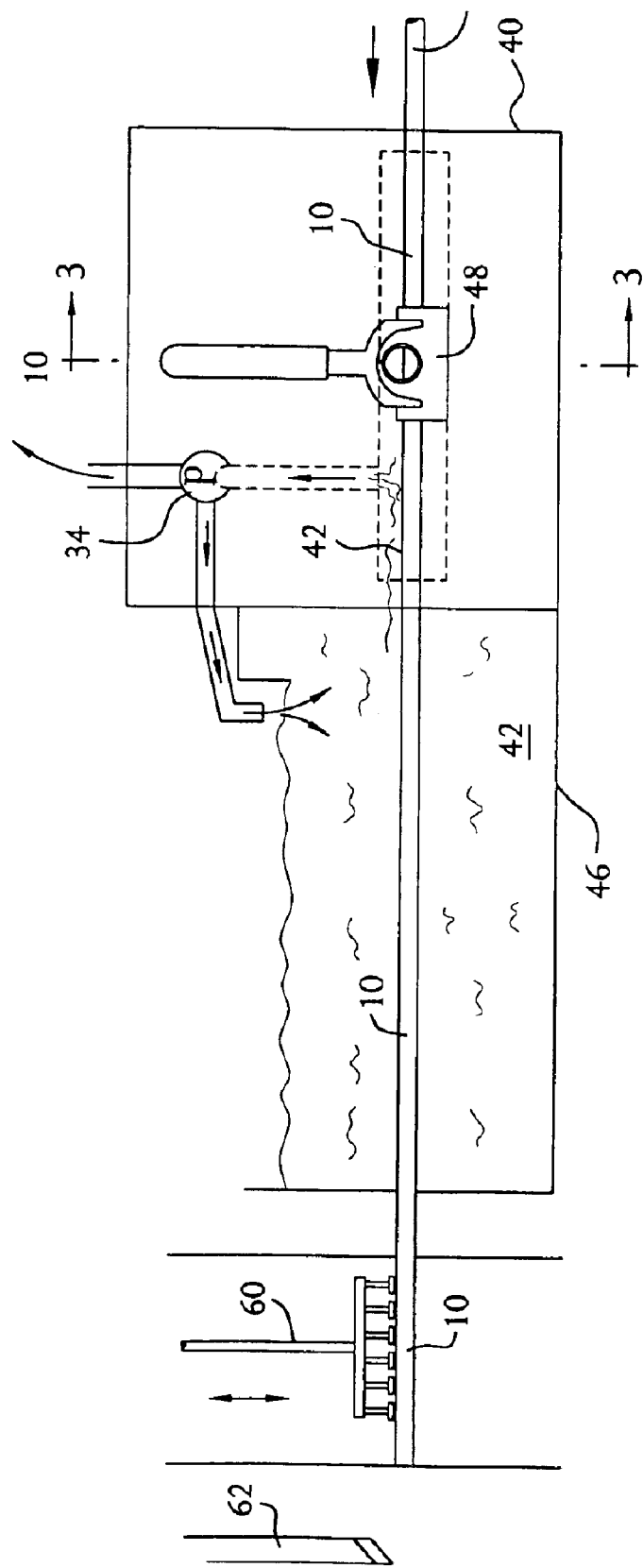
FIG. 1(b) is the remaining portion of the apparatus of FIG. 1(a)
Figure 3:
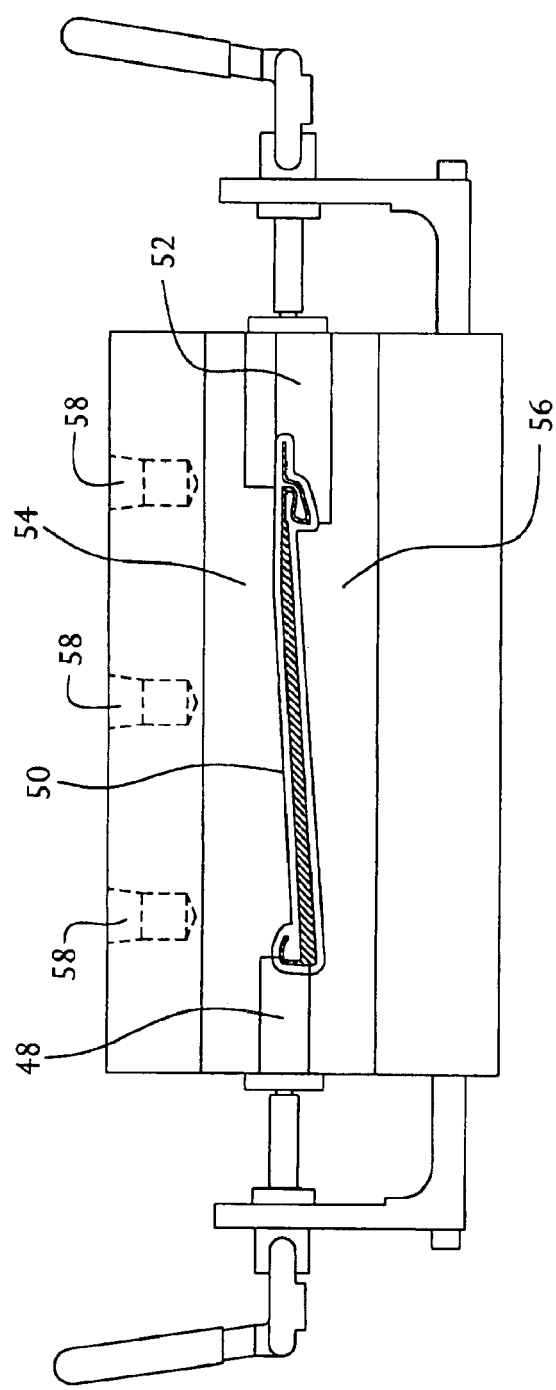
FIG. 3: is a side cross-sectional view taken through line 3—3 of FIG. 1(b), illustrating a preferred final sizer device.

Preferred supplemental forming steps will now be described. With reference to FIGS. 1(a), 1(b) and 3, this invention provides shaping, forming and cutting steps for making individual shaped polymeric articles, such as siding panels 100 and 101, and dentil molding 102, shown in FIGS. 3–5.

As the preferred extruded sheet 10 leaves the mold belt 12 beyond idle roller 16, it preferably has a relatively cool central pattern sheet portion having a temperature of about 140° F., and a relatively hot pair of lateral edge portions 26 and 27, having a temperature of about 250° F. for the preferred PVC compositions. This moving extruded sheet 10 then preferably contacts a first pre-sizer 30 having the thickness of about 1 inch and exhibiting a panel shape. The pre-sizer 30 is located along both lateral edges 26 and 27 of the extruded sheet 10 and is designed to begin shaping the butt edges 103 and 105 and hanger edges 104 and 106, for example, by curling these edges. A second pre-sizer 32 having a thickness of about 4 inches, and also exhibiting a panel shape, further forms these edges while the lateral edge portions 26 and 27 are desirably still above their heat deflection temperature.

With reference to FIG. 1(b) in particular, the extruded sheet 10 is then subjected to a final sizer 40 for substantially finishing the mechanical deformation of the lateral edges 26 and 27. A cross-section of the final sizer is shown in FIG. 3. This device includes a series of adjustable blocks and plates. The final sizer 40 of the preferred embodiment includes a pair of lateral forming block mechanisms 48 and 52 which can be lever operated for a variety of products and sizes. The final sizer 40 also includes top and bottom forming plates 54 and 56 to maintain the planar nature of the product while the edges are being formed.

It is desirable that the butt edges 103 and 105 and nail edges 104 and 106 of this embodiment be subjected to cooling after formation. This can be accomplished as shown in FIG. 1(b), by permitting cooling water 42 to migrate, or be driven or pumped into the final sizer 40. In the preferred embodiment, the cooling water 42 from the final quench tank 46 is allowed to leak back into the final sizer 40 in order to accomplish this goal. The cooling water 42 quickly quenches the product below its heat deflection temperature, so that the newly formed edge portions are quenched to hold their shape. Excess cooling water 42 can be drained by vacuum pump 34 and either removed from the system or recycled back into the quench tank 46.

Following the final sizer operation, the now fully formed extruded sheet 10 is immersed in a quench tank 46 to reduce its temperature to about that of ambient air, or approximately 70–75° F. The continuous sheet is then removed from the quench tank 46 and a preferred punch press 60 is used to mechanically form a plurality of fastener apertures 64 and 68, shown in the siding panels 100 and 101.

Following the production of fastener apertures 64 and 68, the product can be pulled with the puller machine (not shown) to a cut-off station which severs the now cooled, formed extruded sheet into individual lengths of shaped polymeric articles.

It is understood that the above process can be modified in numerous respects without detracting from the invention's benefits. Numerous other molding steps are equally effective in generating the stepped or staggered look of the shakes of this invention. For example, transfer molding of sheet material, injection molding and compression molding using the same molded designs are commercially acceptable. Adjustments can also be made in the quench tank 46 to lift, raise, or otherwise get rid of bends and bows in the product before it reaches ambient temperature. The location, size and number of the water nozzles 27 can vary from about 2 or 3 to over 6 in the central portion of the sheet for cooling various types of formed impressions. Alternatively, the entire cross-section of the shaped polymeric article 100 including edge portions 26 and 27, can be molded or mechanically formed while the extruded sheet 10 is above its heat deflection temperature on the flexible rotating belt 18. This could shorten the overall length of the device considerably, by eliminating the floor space otherwise necessary for one or more lateral edge sizing operations.

An additional advantage of positioning of a drive belt portion 15 between rollers 14 and 16 and the mold belt portion 18 is to facilitate tracking between the two belts and the two rollers. With the use of the preferred woven stainless steel drive belt 15 and a silicone-based rubber mold belt 18, there will be some small amount of sliding movement between the belts. This slight movement has been found to be particularly helpful in maintaining tracking between the belts and the rollers.

There are many aspects of the apparatus of the present invention that tend to untrack the belts. Some of these include the high temperature of the polymer and the difference in distance between the axis of the rollers 14 and 16. Tracking is also made more difficult due to the different elasticity and coefficients of thermal expansion of the preferred silicone and steel belts. To alleviate untracking, the amount of friction between the metal weave belt and the resilient silicon rubber belt should be high enough to assure powering therebetween but low enough to allow for some sliding movement to compensate for some of the tracking irregularities.

From the foregoing, it can be realized that the side provides apparatus and methods for continuous vacuum forming shaped polymeric articles almost without any length limitations. The products can be made extremely thin, well below the thickness limitations of molded products, and preferably about 0.030–0.125 inches in thickness, at a substantial savings from injection molding operations. The present invention also provides a randomness of visual aesthetics, such as a randomness of individual shingles of a cedar shake siding pattern, which is at least 10–50% greater than can be accomplished with 4–5 foot lengths of a similarly configured molded product using the same size shingles.

FIGS. 7(a)–7(e) illustrate another exemplary siding panel according to the present invention having a center portion with a plurality of individual shingle impressions 201 of a cedar shake siding pattern formed thereon. While extrusion and belt vacuum forming is preferred, these panels can be formed by any number of ways, including injection molding, transfer molding, and compression molding, to name a few. Adjacent shingle impressions 201a, 201b, and 201c have substantially the same lengths, designated generally as dimensions "E" in FIG. 7(b).

Each of the shingle impressions 201a, 201b, and 201c include a bottom edge 202a, 203b, and 202c, respectively. Bottom edge 202b is beveled relative to the substantially flat bottom edges 202a, 202c of shingle impressions 201a, 201c. The beveled edges may be formed into the mold impression 11 of a cedar shake siding pattern for transfer to the surface of extruded sheet 10. The beveled bottom edge 202b gives the appearance that shingle impression 201b has a different length than shingle impressions 202a, 202c, even though the shingle impressions 201 have substantially the same lengths. These beveled edges provide a more aesthetically pleasing and realistic appearance through shadow effects when illuminated and compared with the rather jagged appearance provided by a siding pattern utilizing shingle impressions that actually have different lengths.

Figure 7A:
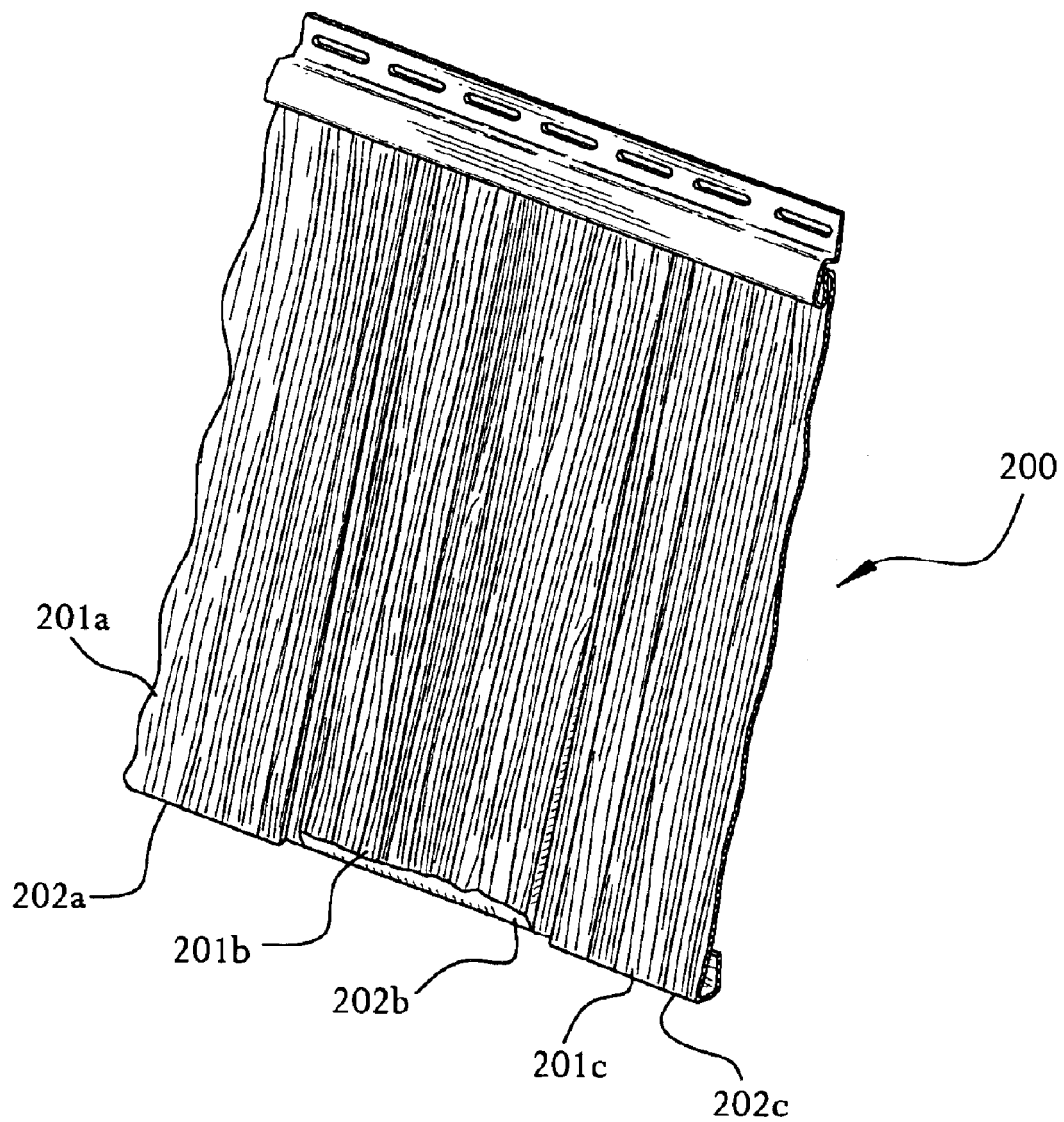
FIG. 7(a) is a partial front perspective view of a siding panel having a shingle impression with a beveled bottom edge.
Figure 7B:
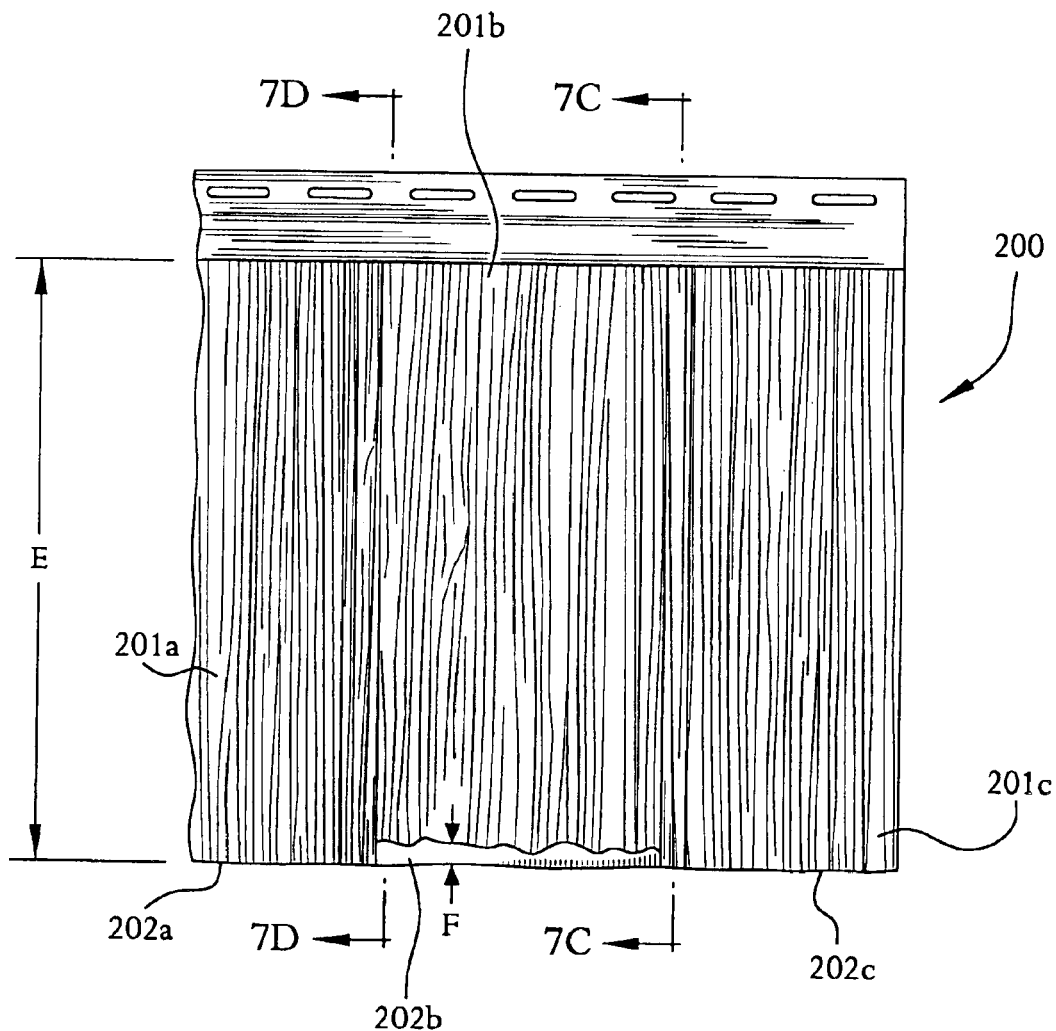
FIG. 7(b) is a front perspective view of the siding panel of FIG. 7(a)
Figure 7C:
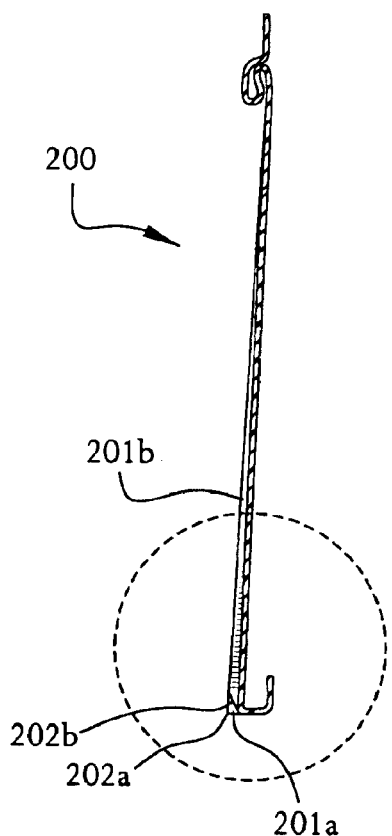
FIG. 7(c) is a cross-sectional view of the siding panel of FIG. 7(b) taken along lines 7C—7C.
Figure 7D:
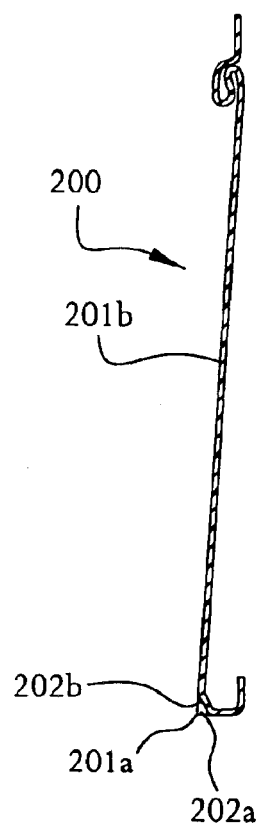
FIG. 7(d) is a cross-sectional view of the siding panel of FIG. 7(b) taken along lines 7D—7D.
Figure 7E:
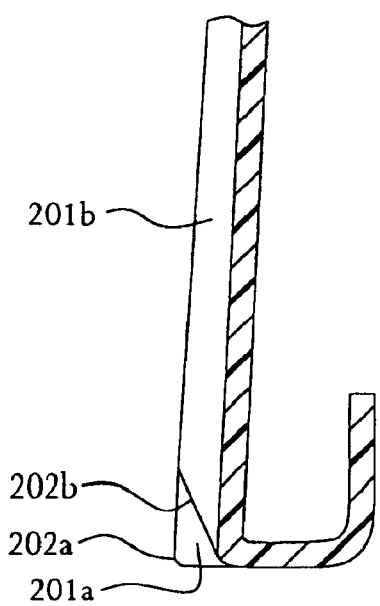
FIG. 7(e) is an enlarged view of portion 7E of FIG. 7(c).

FIG. 7(c) and FIG. 7(d) illustrate that the exemplary siding panel 200 of the present invention has a substantially uniform cross-sectional thickness. An extremely realistic shingle impression, and preferably a cedar shake siding pattern, may be vacuum formed by the process described above to provide siding having a uniform thickness but still having an embossed non-planar facade.

It should be understood that FIG. 7(a) is only illustrative of a shingle impression having a beveled bottom edge, and the present invention is not limited to the siding pattern of shingle impressions shown in FIG. 7(a). Rather, siding panels of significant lengths (e.g., 10' or greater) may be formed using the process described above. Many possible shingle impression patterns, therefore, are possible. Alternating shingle impressions may have beveled bottom edges. Other periodic patterns may also be used, such as every third or fourth, etc. shingle impression having a beveled bottom edge. Alternatively, non-periodic and seemingly random pattern may be chosen. For example, a siding panel having ten adjacent shingle impressions may include successive bottom edges as follows: beveled, beveled, not beveled, not beveled, not beveled, beveled, not beveled, beveled, beveled, not beveled. The appearance of a random selection of individual shingles becomes particularly prominent when relatively long pieces of siding according to the present invention are used together to cover a structure.

Further, each beveled bottom edge need not be identical. Rather, the length (designated as "F"), angle, or combination thereof, of the beveled bottom edges may vary. This variation in beveled edges may also accompany a variation in shingle width. By doing so, the appearance is given that cedar shake shingles of miscellaneous lengths were selected and assembled during siding application, particularly when a structure is viewed as whole.

Although various embodiments have been illustrated, this is for the purpose of describing, and not limiting the invention. Various modifications will become apparent to one skilled in the art and are within the scope of this invention described in the attached claims.

We claim:

1. A siding panel, comprising:
   a sheet of polymeric material, said sheet including a molded central portion comprising a plurality of adjacent shingle impressions of substantially the same length, each of said shingle impressions including a bottom edge, at least one of said bottom edges being beveled to give the appearance of shingles having different lengths.

2. The siding panel of claim 1, further comprising:
   a first lateral edge portion containing a butt edge; and
   a second lateral edge portion containing a nail edge and including a plurality of preform fastener apertures therethrough, said first and second lateral edge portions being formed substantially independently from said forming of said central portion while the polymeric material in said central portion has a temperature below its heat deflection temperature and the polymeric material in said first and second lateral edge portions is above its heat deflection temperature.

3. The siding panel of claim 1, wherein said shingle impressions are vacuum formed on a rotating belt.

4. The siding panel of claim 1, wherein said polymeric material comprises polyvinyl chloride.

5. The siding panel of claim 1, wherein said siding panel has a length of at least 10'.

6. The siding panel of claim 1, wherein said central portion comprises a thickness of about 0.03–0.125".

7. The siding panel of claim 1, wherein said shingle impressions are cedar shake shingle impressions and a plurality of said bottom edges are beveled.

8. The siding panel of claim 7, wherein alternating bottom edges are beveled.

9. The siding panel of claim 7, wherein said plurality of said bottom edges are beveled in a non-periodic pattern.

10. A continuously formed siding panel, comprising:
   a sheet of polymeric material, including a central portion comprising a plurality of adjacent shingle impressions of substantially the same length, each of said shingle impressions including a bottom edge, a plurality of said bottom edges being beveled to give the appearance of shingles having different lengths;
   a butt edge disposed along a first lateral edge portion of said sheet; and
   a nail edge disposed along a second lateral edge portion of said sheet, said butt edge and said nail edge being formed substantially independently from said central portion.

11. The siding panel of claim 10, wherein said shingle impressions are vacuum formed, blow molded, compression molded, transfer molded or injection molded.

12. The siding panel of claim 10, wherein said shingle impressions are cedar shake shingle impressions.

13. The siding panel of claim 12, wherein alternating bottom edges are beveled.

14. The siding panel of claim 12, wherein said bottom edges are beveled in a non-periodic pattern.

15. A continuously formed siding panel of substantially unlimited length, comprising:
   an extruded sheet of polymeric material comprising polyvinyl chloride, said sheet including a central vacuum-formed portion having a plurality of adjacent cedar shake shingle impressions of substantially the same length, each of said cedar shake shingle impressions having a bottom edge, a plurality of non-adjacent cedar shake shingles having a bottom which is beveled to give the appearance of shingles having different lengths;
   a butt edge disposed along a first lateral edge portion of said sheet; and
   a nail edge disposed along a second lateral edge portion of said sheet, said lateral edge portions formed after said central portion has been vacuum-formed and while the polymeric material in said lateral edge portions is above the heat deflection point of said polymeric material.

* * * * *